United States Patent
Ishida

(10) Patent No.: US 8,395,649 B2
(45) Date of Patent: Mar. 12, 2013

(54) PROJECTOR, TERMINAL, CONFERENCING SYSTEM, TREE STRUCTURE SWITCHING METHOD AND RECORDING MEDIUM

(75) Inventor: Kouji Ishida, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 1296 days.

(21) Appl. No.: 12/087,018

(22) PCT Filed: Nov. 2, 2007

(86) PCT No.: PCT/JP2007/071752
§ 371 (c)(1),
(2), (4) Date: Jun. 24, 2008

(87) PCT Pub. No.: WO2008/072434
PCT Pub. Date: Jun. 19, 2008

(65) Prior Publication Data
US 2010/0165073 A1    Jul. 1, 2010

(30) Foreign Application Priority Data
Dec. 7, 2006   (JP) ................... 2006-330641

(51) Int. Cl.
*H04N 7/14* (2006.01)
(52) U.S. Cl. .................. 348/14.01; 348/14.12
(58) Field of Classification Search .... 348/14.01–14.09; 709/204
See application file for complete search history.

(56) References Cited

U.S. PATENT DOCUMENTS

| | | | |
|---|---|---|---|
| 6,560,637 B1 * | 5/2003 | Dunlap et al. | 709/204 |
| 6,735,616 B1 | 5/2004 | Thompson et al. | |
| 6,750,883 B1 | 6/2004 | Parupudi et al. | |
| 7,315,516 B2 | 1/2008 | Byun | |
| 2003/0126326 A1 | 7/2003 | Nomizo et al. | |

(Continued)

FOREIGN PATENT DOCUMENTS

| | | |
|---|---|---|
| JP | 10-63598 | 3/1998 |
| JP | 11-55258 | 2/1999 |

(Continued)

OTHER PUBLICATIONS

PCT/ISA/237 (written opinion of the international authority).

(Continued)

*Primary Examiner* — Curtis Kuntz
*Assistant Examiner* — Sunita Joshi
(74) *Attorney, Agent, or Firm* — McGinn IP Law Group, PLLC

(57) ABSTRACT

A conferencing system prevents useless data processing that accompanies data communication from occurring even when a presenter's device that outputs image data is switched. A projector functions as a node in a tree structural network, and projects an image corresponding to image data and sends the image data to the direct child indicated in parent-child information when receiving the image data from the direct parent indicated in the parent-child information. A switching module, when receiving a switching request for making a request to switch a parent-child relationship from the direct child, sends the switching request to the direct parent, when receiving permission information representing permission to switch from the direct parent, sends the permission information to the direct child that sent the switching request and changes the parent-child information so that the direct parent becomes the direct child and the direct child that sent the switching request becomes the direct parent.

9 Claims, 12 Drawing Sheets

U.S. PATENT DOCUMENTS

| | | |
|---|---|---|
| 2003/0191836 A1 | 10/2003 | Murtha et al. |
| 2004/0213168 A1 | 10/2004 | Byun |

FOREIGN PATENT DOCUMENTS

| | | |
|---|---|---|
| JP | 2000-92466 A | 3/2000 |
| JP | 2002-26950 | 1/2002 |
| JP | 2002-259315 | 9/2002 |
| JP | 2003-87248 A | 3/2003 |
| JP | 2003-87288 A | 3/2003 |
| JP | 2003-242298 | 8/2003 |
| JP | 2003-259324 A | 9/2003 |
| JP | 2003-271488 | 9/2003 |
| JP | 2004-56551 A | 2/2004 |
| JP | 2005-502272 | 1/2005 |
| JP | 2005-33627 | 2/2005 |
| JP | 2005-94264 | 4/2005 |
| JP | 2006-3903 A | 1/2006 |
| JP | 2006-65660 | 3/2006 |
| JP | 2006-222987 | 8/2006 |
| JP | 2006-245876 | 9/2006 |
| JP | 2006-279535 | 10/2006 |

OTHER PUBLICATIONS

PCT/IB/326.
PCT/IB/373.
Japanese Office Action dated Feb. 28, 2012, with partial English translation.

* cited by examiner

PROJECTOR, TERMINAL, CONFERENCING SYSTEM, TREE STRUCTURE SWITCHING METHOD AND RECORDING MEDIUM

TECHNICAL FIELD

The present invention relates to a projector, a terminal, a conferencing system, a tree structure switching method and a recording medium.

BACKGROUND ART

Conferencing systems in which a plurality of devices are connected are well known. In the conferencing system, a presenter's device sends data such as images directly or indirectly to another device. The other device displays the data such as images that is sent from the presenter's device. Therefore, participants in a conference can view the same images by watching the display of each device.

FIG. 1 is a block diagram showing a conferencing system in which PC 101, which is a presenter's device, provides image data and voice data directly to other terminals (projectors and PCs) 102 to 110.

In addition, Patent Document 1 (JP-A No. 2006-279535) describes a conferencing system in which a plurality of terminals are connected to a conference server through a network. In this conferencing system, a presenter's device provides data such as images to a conference server. The conference server sends the data, which is provided from the presenter's device, to the other terminals.

In addition, conferencing systems in which a plurality of servers that are connected to terminals are connected to a conference server by a tree structure are also well known. FIG. 2 is a block diagram showing a conferencing system including a tree structure.

In FIG. 2, PC 201, which is a presenter's device, provides data such as images to projector 202, which is a conference server (conference master). Projector 202 provides the data to PC 203 and projector 204. Projector 204 provides the data to PC 205 and projectors 206 and 208. Projector 206 provides the data to PC 207. Projector 208 provides the data to PCs 209 and 210.

In these conferencing systems, one predetermined server always operates as a conference server.

Note that, in these conferencing systems, a PC (terminal) that serves as a presenter's device may be switched when there is a change of presenter.

[Patent Document 1] JP-A No. 2006-279535

DISCLOSURE OF THE INVENTION

Exemplary Problems to be Solved by the Invention

The structure of a conferencing system shown in FIG. 1 and the structure of a conferencing system described in Patent Document 1 are not of a tree type. Therefore, all data transmission loads concentrate on a presenter's device or a conference server. Thus, as terminals participating in the conferencing system increase, the communication band becomes deficient. Accordingly, the transmission of image data and voice data may slow down.

On the contrary, in a conferencing system including a tree structure shown in FIG. 2, data transmission loads are distributed among each projector.

However, in the conferencing system including a tree structure shown in FIG. 2, a conference server is fixed. Therefore, if a PC that is not connected directly to the conference server becomes a presenter's device, useless processing of data will become necessary.

FIG. 3 is an explanatory diagram for illustrating the flow of data when PC 207 shown in FIG. 2 becomes a presenter's device. Note that, in FIG. 3, identical symbols are assigned to identical elements shown in FIG. 2.

As shown in FIG. 3, when PC 207 becomes a presenter's device, for example, PC 207 first provides image data and voice data to projector 202, which is a conference server, through projectors 206 and 204. Subsequently, projector 202 provides these image data and voice data to the other devices.

Therefore, useless data processing in which the presenter's device sends data to the conference server through the other devices (projectors 206 and 204 in FIG. 3) will become necessary. Accordingly, communication loads increase.

It is an exemplary purpose of the present invention to provide a projector, a terminal, a conferencing system, a tree structure switching method and a recording medium that can prevent useless data processing, which accompanies data communication, from occurring even when a terminal (presenter's device) that outputs image data is switched.

That is to say, it is an exemplary purpose of the present invention to provide a projector, a terminal, a conferencing system, a tree structure switching method and a recording medium that can solve the above problems.

Means for Solving the Problems

In order to achieve the above and other exemplary purposes, a projector according to the present invention can function as a node in a tree structural network, the projector includes projecting means, storage means for storing parent-child information that indicates a direct parent and a direct child in the network, data control means for using the projecting means to project an image corresponding to image data and sending the image data to the direct child indicated in the parent-child information when receiving the image data from the direct parent indicated in the parent-child information and change means, when receiving a switching request for making a request to switch a parent-child relationship from the direct child, for sending the switching request to the direct parent, and when receiving permission information representing permission to switch from the direct parent, for sending the permission information to the direct child that sent the switching request and changing the parent-child information so that the direct parent becomes the direct child, and the direct child that sent the switching request becomes the direct parent.

A terminal according to the present invention can function as a node in a tree structural network, the terminal includes storage means for storing a parent ID when its own terminal is a parent, display means for displaying an image, transmission means for sending image data corresponding to the image displayed on the display means to a child on a network to which its own terminal is connected when the storage means stores the parent ID, first change means for sending permission information representing permission to switch to the child and for deleting the parent ID in the storage means when receiving a switching request for making a request to switch a parent-child relationship from the child under circumstances where the storage means stores the parent ID, output control means, when receiving image data from a parent on a network to which its terminal is connected under circumstances where the storage means does not store the parent ID, for displaying an image corresponding to the image data on the display means and second change means, under circumstances where the storage means does not store the parent ID when receiving an instruction to send the switching request, for sending the switching request to the parent, and for storing the parent ID in the storage means when receiving the permission information from the parent.

A conferencing system according to the present invention is comprised of a projector and a terminal that can function as a node in a tree structural network, the projector includes projecting means, storage means for storing parent-child information that indicates a direct parent and a direct child in the network, data control means for using the projecting means to project an image corresponding to image data and sending the image data to the direct child indicated in the parent-child information when receiving the image data from the direct parent indicated in the parent-child information, and change means, when receiving a switching request for making a request to switch a parent-child relationship from the direct child, for sending the switching request to the direct parent, and when receiving permission information representing permission to switch from the direct parent, for sending the permission information to the direct child that sent the switching request and changing the parent-child information so that the direct parent becomes the direct child, and the direct child that sent the switching request becomes the direct parent and the terminal includes storage means for storing a parent ID when its own terminal is a parent, display means for displaying an image, transmission means for sending image data corresponding to the image displayed on the display means to a child on a network to which its own terminal is connected when the storage means stores the parent ID, first change means for sending the permission information to the child and deleting the parent ID in the storage means, when receiving the switching request from the child under circumstances where the storage means stores the parent ID, output control means, when receiving the image data from a parent on the network to which its terminal is connected under circumstances where the storage means does not store the parent ID, for displaying an image corresponding to the image data on the display means, and second change means, under circumstances where the storage means does not store the parent ID when accepting an instruction to send the switching request, for sending the switching request to the parent, and for storing the parent ID in the storage means when receiving the permission information from the parent.

A tree structure switching method of a projector that can function as a node in a tree structural network according to the present invention includes storing parent-child information that indicates a direct parent and a direct child in the network, projecting an image corresponding to image data and sending the image data to the direct child indicated in the parent-child information when the image data is received from the direct parent indicated in the parent-child information, sending a switching request for making a request to switch a parent-child relationship to the direct parent when the switching request is received from the direct child, and sending permission information representing permission to switch to the direct child that sent the switching request and changing the parent-child information so that the direct parent becomes the direct child, and the direct child that sent the switching request becomes the direct parent when the permission information is received from the direct parent.

A tree structure switching method of a terminal that can function as a node in a tree structural network and that stores a parent ID when the terminal is a parent according to the present invention includes sending image data corresponding to a displayed image to a child on a network to which the terminal is connected when the parent ID is stored, sending permission information representing permission to switch to the child and deleting the parent ID when a switching request for making a request to switch a parent-child relationship is received from the child under circumstances where the parent ID is stored, displaying an image corresponding to image data when the image data is received from a parent on a network to which the terminal is connected under circumstances where the parent ID is not stored, and sending the switching request to the parent, under circumstances where the parent ID is not stored, when an instruction to send the switching request is accepted, and storing the parent ID when the permission information is received from the parent.

A computer readable recording medium according to the present invention, on which a program is embedded, the program causes a computer that can function as a node in a tree structural network to execute a procedure for storing parent-child information that indicates a direct parent and a direct child in the network, a procedure for projecting an image corresponding to image data and sending the image data to the direct child indicated in the parent-child information when the image data is received from the direct parent indicated in the parent-child information, a procedure for sending a switching request for making a request to switch a parent-child relationship to the direct parent when the switching request is received from the direct child, and a procedure for sending permission information representing permission to switch to the direct child that sent the switching request and to change the parent-child information so that the direct parent becomes the direct child, and the direct child that sent the switching request becomes the direct parent when the permission information is received from the direct parent.

A computer readable recording medium according to the present invention, on which a program is embedded, the program causes a computer that can function as a node in a tree structural network and that stores a parent ID when the computer is a parent, to execute a procedure for sending image data corresponding to a displayed image to a child on a network to which the computer is connected when the parent ID is stored, a procedure for sending permission information representing permission to switch to the child and to delete the parent ID when a switching request for making a request to switch a parent-child relationship is received from the child under circumstances where the parent ID is stored, a procedure for displaying an image corresponding to image data when the image data is received from a parent on a network to which the computer is connected under circumstances where the parent ID is not stored, and a procedure for sending the switching request to the parent, under circumstances where the parent ID is not stored, when an instruction to send the switching request is accepted, and for storing the parent ID when the permission information is received from the parent.

Exemplary Advantages of the Invention

According to the present invention, it is possible to prevent useless data processing, which accompanies data communication, from occurring even when a terminal that outputs image data is switched.

Figure 1:
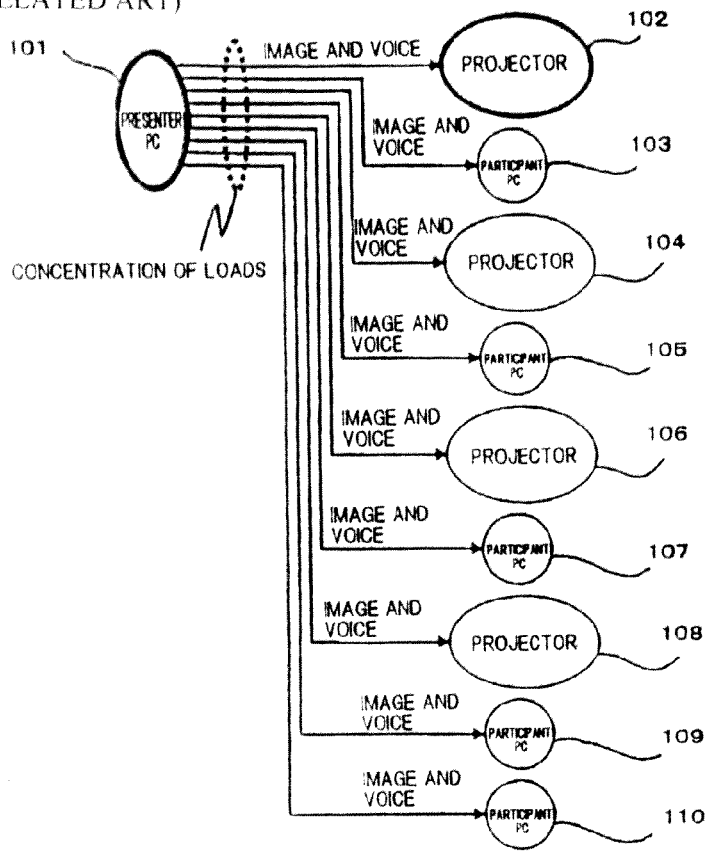
FIG. 1 is a block diagram showing a conferencing system in which a presenter's device provides image data and voice data directly to other terminals.

Description of reference characters:

| | |
|---|---|
| 1A to 1D | projector |
| 2A to 2F | PC |
| 11, 11B, 21, 21B | memory |
| 12, 22 | TCP/IP protocol stacker |
| 13, 25 | conference manager |
| 13a, 13aB | data controller |
| 13b, 13bB | change section |
| 13c | setting section |
| 25a | transmission manager |
| 25b | first change section |
| 25c | output manager |
| 25d | second change section |
| 25e | change section |
| 14, 26a | voice expander |
| 15, 26b | voice output device |
| 16, 23a | image expander |
| 17, 23b | video display |
| 18 | sound output section |
| 19, 19B | projecting section |
| 23, 23B | display |
| 24 | transmission driver |
| 24a | screen capturing section |
| 24b | image compressor |
| 24c | voice recording device |
| 24d | voice compressor |
| 26 | sound output section |
| 27 | microphone |

-continued

Description of reference characters:

| | |
|---|---|
| 28B | transmitter |
| 29B | output controller |

BEST MODE FOR CARRYING OUT THE INVENTION

Next, the configuration of an exemplary embodiment will be described in detail with reference to the drawings.

Figure 4A:
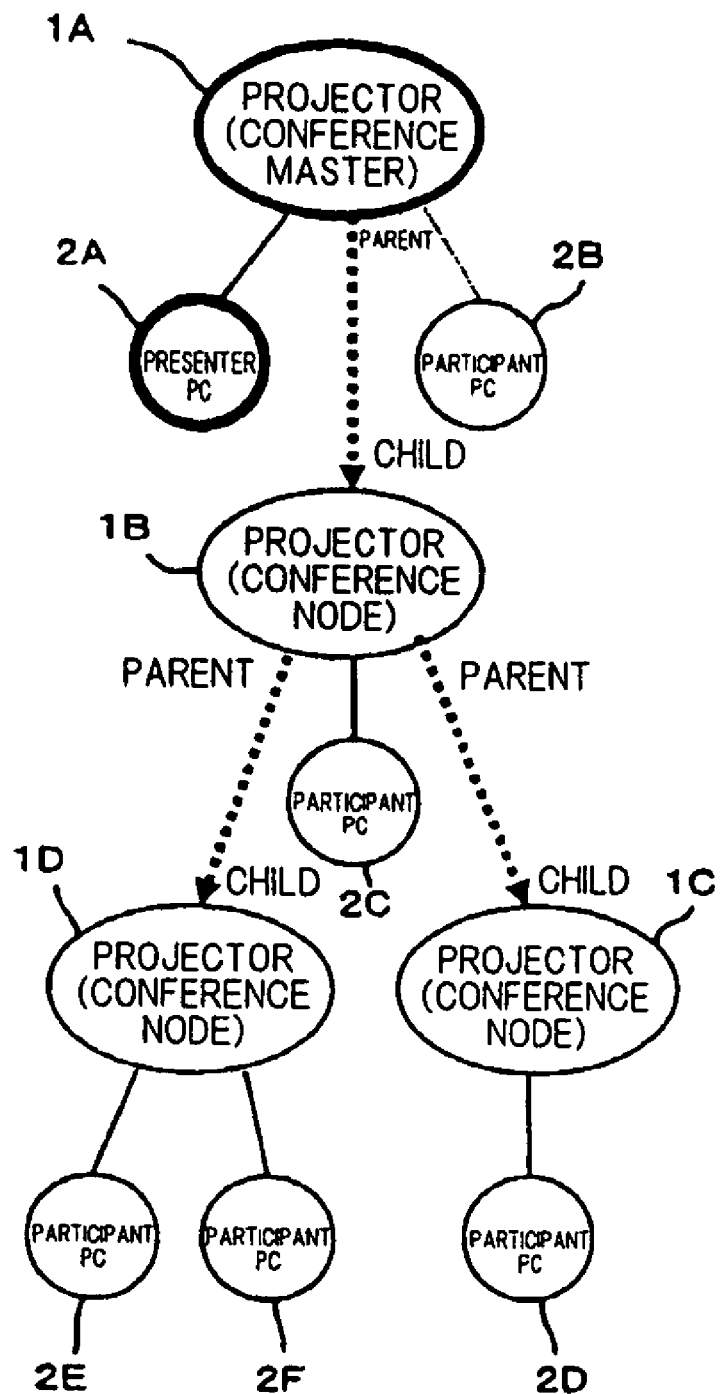
FIG. 4A is a block diagram showing a tree structure-type conferencing system of a first exemplary embodiment.

FIG. 4A is a block diagram showing a tree structure-type conferencing system of a first exemplary embodiment.

In FIG. 4A, the tree structure-type conferencing system comprises a plurality of network projectors (hereinafter referred to as only "projector") 1A to 1D, each of which incorporates therein a conference management function, and a plurality of terminal devices (hereinafter referred to as "PC") 2A to 2F, each of which is installed therein the conference management function. The number of the projectors is not limited to four, and may be changed as appropriate. The number of terminal devices such as computers is also not limited to six, and may be changed as appropriate.

Each of projectors 1A to 1D is a node connected by a tree structure. Each of projectors 1A to 1D constructs a conference support system.

Projector 1A is a conference master (conference server). In addition, projector 1A is the direct parent of projector 1B. Projector 1B is the direct child of projector 1A. In addition, projector 1B is the direct parent of projectors 1C and 1D. Projector 1C is the direct child of projector 1B. Projector 1D is the direct child of projector 1B. Note that projectors 1B to 1D serve as conference nodes.

PC 2A, recognizing projector 1A as its direct child, is connected to projector 1A. Note that projector 1A is a root node of the tree structure formed by projectors 1A to 1D. PC 2A is a presenter's device used by a presenter.

PC 2B, recognizing projector 1A as its direct parent, is connected to projector 1A. PC 2B is a participant's device used by a participant.

Each of PCs 2C to 2F is a participant's device used by a participant. PC 2C, recognizing projector 1B as its direct parent, is connected to projector 1B. PC 2D, recognizing projector 1C as its direct parent, is connected to projector 1C. PC 2E and 2F, recognizing projector 1D as their direct parent, are connected to projector 1D.

The presenter's device (PC 2A in FIG. 4A) sends image data and voice data (sound data) to the conference master (projector 1A in FIG. 4A), which is its direct child.

The conference master projects an image corresponding to the image data received from the presenter's device. The conference master outputs sound corresponding to the voice data received from the presenter's device. The conference master further sends these image data and voice data to its direct children (for example, conference node and participant's device).

The conference node projects an image corresponding to the image data received from its direct parent. The conference node outputs sound corresponding to the voice data received from its direct parent. The conference node further sends these image data and voice data to its direct children.

The participant's device displays an image corresponding to the image data received from its direct parent. The participant's device outputs sound corresponding to the voice data received from its direct parent.

Note that, in the conferencing system shown in FIG. 4A, image data and voice data are sent from a parent to its child. However, only image data may be sent from a parent to its child, for example.

In the present exemplary embodiment, the tree structure of the conferencing system changes accompanying the switching of a presenter's device.

Figure 4B:
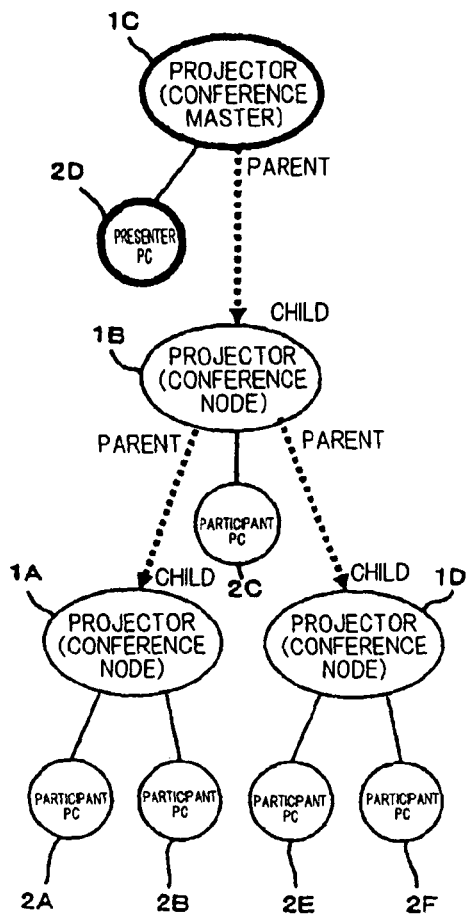
FIG. 4B is a block diagram showing a tree structure-type conferencing system of the first exemplary embodiment.

FIG. 4B is a block diagram showing the change of the tree structure when a presenter's device is switched from PC 2A to PC 2D in the conferencing system shown in FIG. 4A. In FIG. 4B, identical symbols are assigned to identical elements shown in FIG. 4A.

In FIG. 4B, PC 2D becomes a presenter's device. In addition, PC 2D becomes the direct parent of projector 1C. Projector 1C becomes a conference master. Projector 1C becomes the direct child of PC 2D. In addition, projector 1C becomes the direct parent of projector 1B.

Projector 1B is a conference node. In addition, projector 1B becomes the direct child of projector 1C. Projector 1B becomes the direct parent of projectors 1A and 1D and PC 2C. PC 2C is the direct child of projector 1B.

Projector 1A becomes a conference node. In addition, projector 1A becomes the direct child of projector 1B. Projector 1A becomes the direct parent of PCs 2A and 2B. PC 2A becomes a participant's device. In addition, PC 2A becomes the direct child of projector 1A.

Projector 1D is a conference node. In addition, projector 1D is the direct child of projector 1B. Projector 1D is the direct parent of PCs 2E and 2F. PC 2B is a participant's terminal. PC 2B is the direct child of projector 1A. PCs 2E and 2F are participant's terminals. PCs 2E and 2F are the direct children of projector 1D.

Figure 5:
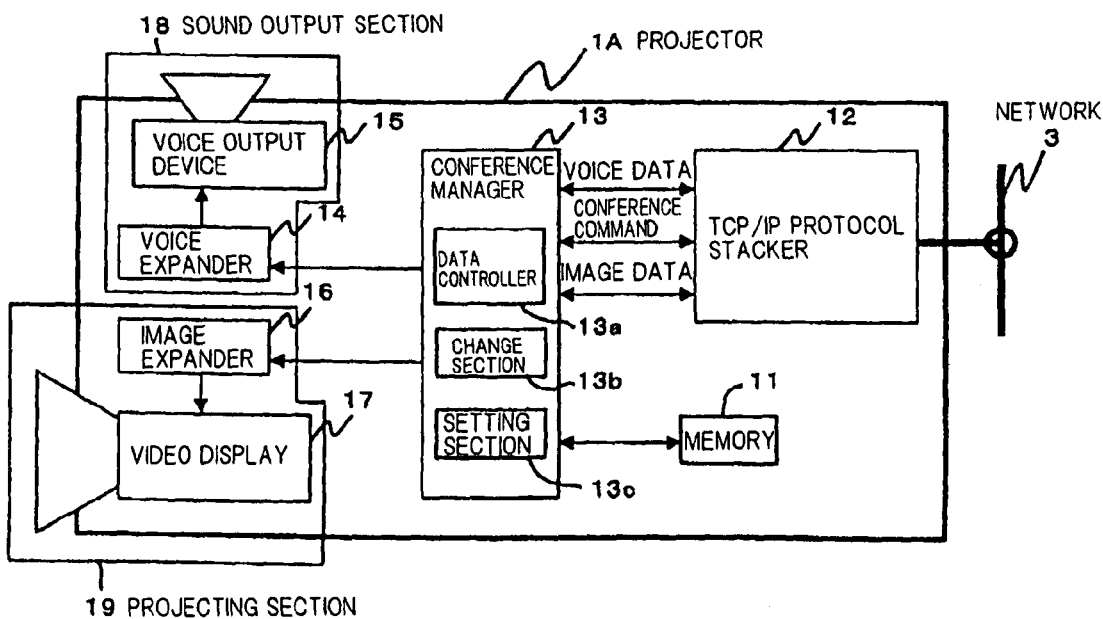
FIG. 5 is a block diagram showing an exemplary embodiment of projector 1A.

FIG. 5 is a block diagram showing an exemplary embodiment of projector 1A. Note that projectors 1B to 1D have the identical configuration to that of projector 1A. Therefore, explanation of the configuration of projectors 1B to 1D will be omitted.

In FIG. 5, projector 1A comprises memory 11, transmission control protocol/internet protocol (TCP/IP) protocol stacker 12, conference manager 13, voice expander 14, voice output device 15, image expander 16 and video display 17. Voice expander 14 and voice output device 15 are included in sound output section 18. Image expander 16 and video display 17 are included in projecting section 19.

Sound output section 18 is sometimes called sound output means. Projecting section 19 is sometimes called projecting means.

Memory 11 is sometimes called storage means.

Memory 11 is sometimes called a storage section. Memory 11 stores parent-child information indicating a direct parent and a direct child of one's own projector.

TCP/IP protocol stacker 12 is a software group in which a protocol for communication normally used in the Internet and Intranets is implemented.

Conference manager 13 comprises data controller 13a, change section 13b and setting section 13c. Conference manager 13 manages the operation of its own projector based on the parent-child information in memory 11, for example.

Data controller 13a is sometimes called data control means.

When receiving compressed image data and compressed voice data through TCP/IP protocol stacker 12 from its direct parent that is indicated in the parent-child information, data controller 13a uses projecting section 19 to project an image corresponding to the image data, and uses sound output section 18 to output voice corresponding to the voice data. More specifically, data controller 13a provides the image data to image expander 16. In addition, data controller 13a provides the voice data to voice expander 14.

In addition, data controller 13a sends these image data and voice data to its direct child indicated in the parent-child information through TCP/IP protocol stacker 12.

Change section 13b is sometimes called change means.

When receiving from its direct child a presenter switching command (switching request) for making a request to switch the parent-child relationship, change section 13b sends the presenter switching command to its direct parent. When receiving from its direct parent a presenter switching result command (permission command), which represents the permission for the change of the parent-child relationship, change section 13b sends the presenter switching result command to the direct child that sent the presenter switching command. Subsequently, change section 13b changes its direct parent to its direct child and changes the direct child that sent the presenter switching command to its direct parent by changing the parent-child information in memory 11.

Setting section 13c sets the parent-child relationship of its own projector.

Note that, as conference manager 13, for example, a CPU that is an exemplary embodiment of a computer may be used. In this case, a program for achieving the function of conference manager 13 is stored in memory 11. Conference manager 13, which is a CPU, reads and executes the program from memory 11, and achieves the function described above. Memory 11 is an exemplary embodiment of a computer readable recording medium.

Voice expander 14 expands the voice data that is accepted from conference manager 13. Voice expander 14 provides the expanded voice data to voice output device 15.

Voice output device 15 outputs sound corresponding to the voice data that is accepted from voice expander 14.

Image expander 16 expands the image data that is accepted from conference manager 13. Image expander 16 provides the expanded image data to video display 17.

Video display 17 projects an image corresponding to the image data that is accepted from image expander 16 on a screen (not shown), for example.

Figure 6:
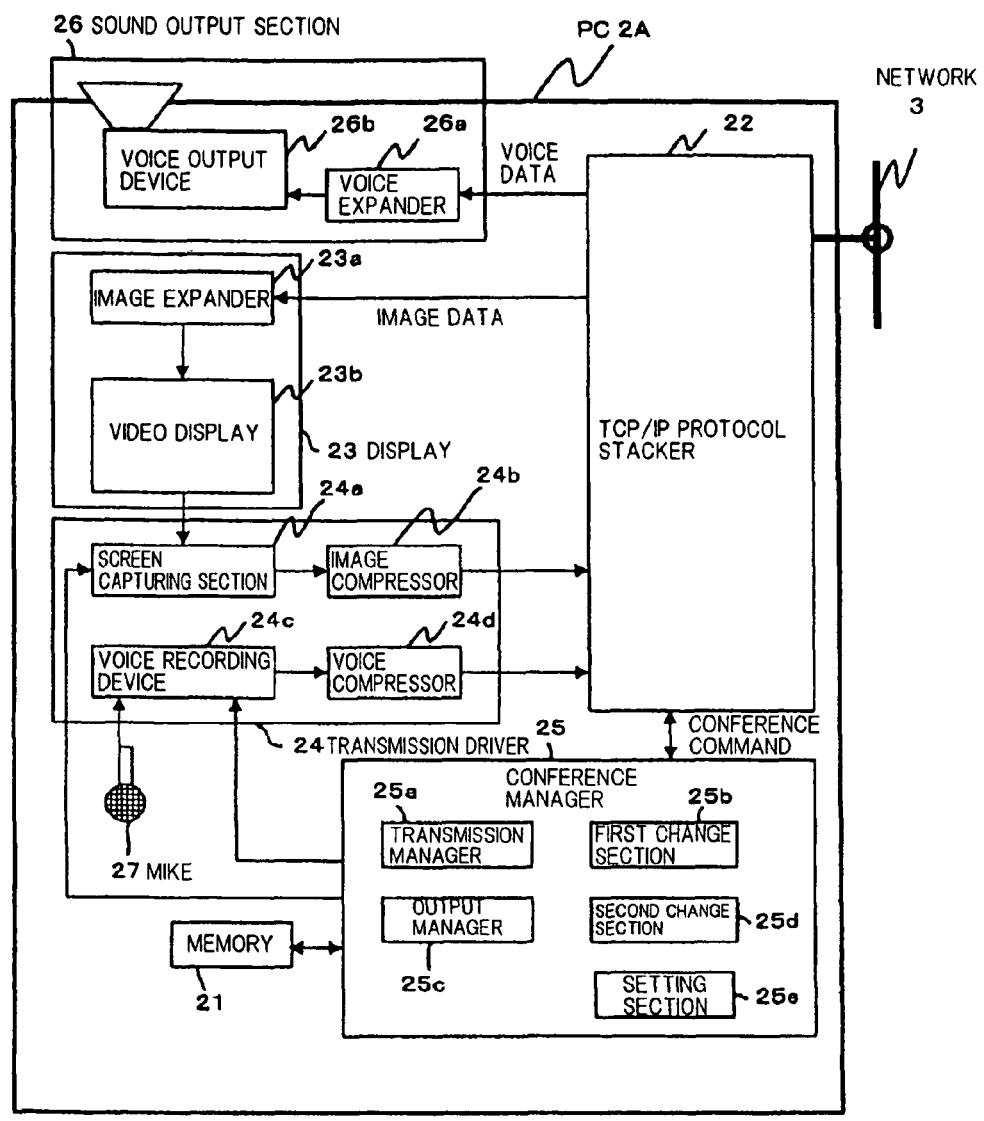
FIG. 6 is a block diagram showing an exemplary embodiment of PC 2A.

FIG. 6 is a block diagram showing an exemplary embodiment of PC 2A. Note that PCs 2B to 2F have the identical configuration to that of PC 2A. Therefore, explanation of the configuration of PCs 2B to 2F will be omitted.

In FIG. 6, PC 2A comprises memory 21, TCP/IP protocol stacker 22, display 23, transmission driver 24, conference manager 25 and sound output section 26.

Display 23 comprises image expander 23a and video display 23b. Transmission driver 24 comprises screen capturing section 24a, image compressor 24b, voice recording device 24c and voice compressor 24d. Conference manager 25 comprises transmission manager 25a, first change section 25b, output manager 25c, second change section 25d and setting section 25e. Sound output section 26 comprises voice expander 26a and voice output device 26b.

Memory 21 is sometimes called storing means.

Memory 21 is sometimes called a storing section. Memory 21 stores a parent ID (parent identification information) only when its own terminal is a parent.

Display 23 is sometimes called display means.

Display 23 displays images. More specifically, image expander 23a expands the compressed image data that is provided from TCP/IP protocol stacker 22. Image expander 23a provides the expanded image data to video display 23b. Video display 23b displays an image corresponding to the image data that is accepted from image expander 23a.

Transmission driver 24 sends image data corresponding to the image displayed on display 23 to the direct child of its own terminal through TCP/IP protocol stacker 22 when a parent ID is stored in memory 21.

More specifically, when a parent ID is stored in memory 21, screen capturing section 24a captures the screen on display 23. Screen capturing section 24a provides image data, which represents the captured screen, to image compressor 24b.

Image compressor 24b compresses the image data that is accepted from screen capturing section 24a. Image compressor 24b sends the compressed image data to the direct child of its own terminal through TCP/IP protocol stacker 22.

In addition, transmission driver 24 sends voice data that is accepted from microphone 27 to the direct child of its own terminal through TCP/IP protocol stacker 22 when a parent ID is stored in memory 21.

More specifically, when a parent ID is stored in memory 21, voice recording device 24c records the voice data that is accepted from microphone 27. Voice recording device 24c provides the voice data to voice compressor 24d.

Voice compressor 24d compresses the voice data that is accepted from voice recording device 24c. Voice compressor 24d sends the compressed voice data to the direct child of its own terminal through TCP/IP protocol stacker 22.

Conference manager 25 manages the operation of its own PC based on information in memory 21.

When a parent ID is stored in memory 21, transmission manager 25a causes screen capturing section 24a and voice recording device 24c to operate, and causes TCP/IP protocol stacker 22 to execute processing to send the data, which is accepted from transmission driver 24, to the direct child of its own terminal.

Note that transmission manager 25a and transmission driver 24 are included in a transmitter.

The transmitter (transmission manager 25a and transmission driver 24) is sometimes called transmission means.

First change section 25b is sometimes called first change means.

Under circumstances where memory 21 stores a parent ID, when receiving a presenter switching command from its direct child, first change section 25b sends a presenter switching result command, which represents permission to switch, to the direct child, and deletes the parent ID in memory 21.

When no parent ID is stored in memory 21, output manager 25c causes TCP/IP protocol stacker 22 to perform processing in which the compressed image data from a projector that is connected directly thereto is provided to image expander 23a, and the compressed voice data from the projector that is connected directly thereto is provided to voice expander 26a.

Note that output manager 25c and TCP/IP protocol stacker 22 are included in an output controller.

The output controller (output manager 25c and TCP/IP protocol stacker 22) is sometimes called output control means.

Second change section 25d is sometimes called second change means.

Under circumstances where memory 21 stores no parent ID, when accepting an instruction from a user to send a switching request, second change section 25d sends a presenter switching command to a projector connected directly thereto. When receiving from the projector a presenter switching result command, which represents the permission to switch, second change section 25d stores a parent ID in memory 21.

Setting section 25e sets the parent-child relationship of its own device.

Note that, as conference manager 25, for example, a CPU, which is an exemplary embodiment of a computer, may be used. In this case, a program for achieving the function of conference manager 25 is stored in memory 21. Conference manager 25, which is a CPU, reads and executes the program from memory 21, and achieves the above described function. Memory 21 is an exemplary embodiment of a computer readable recording medium.

Sound output section 26 is sometimes called sound output means.

Sound output section 26 outputs voice corresponding to the voice data that is provided from TCP/IP protocol stacker 22.

More specifically, voice expander 26a expands the voice data accepted from TCP/IP protocol stacker 22. Voice expander 26a provides the expanded voice data to voice output device 26b.

Voice output device 26b outputs sound corresponding to the voice data accepted from voice expander 26a.

Figure 7:
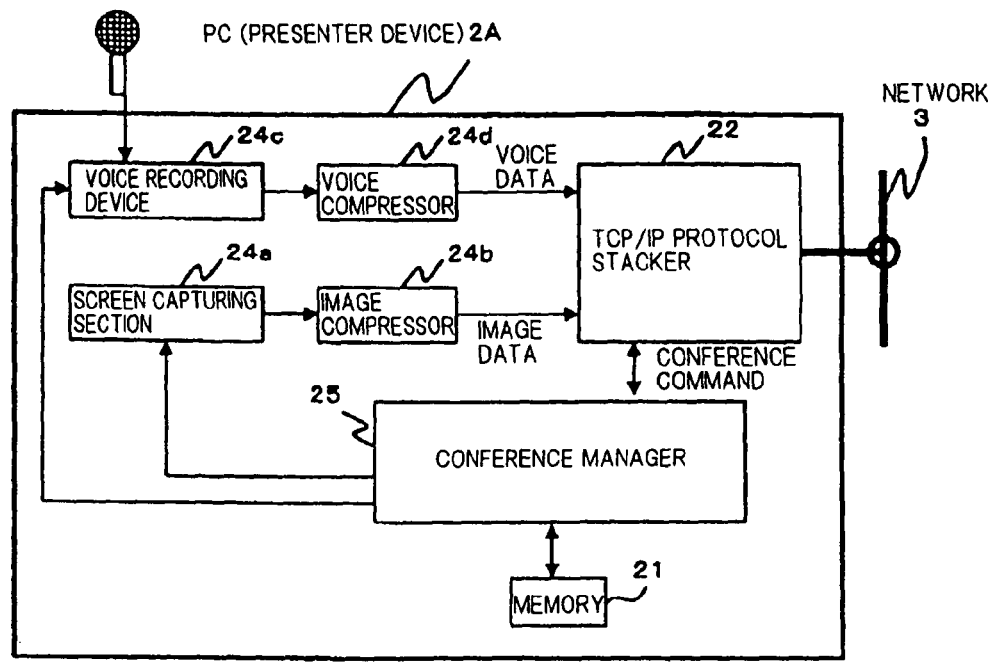
FIG. 7 is a block diagram showing components functioning when PC 2A is a presenter's device.
Figure 8:
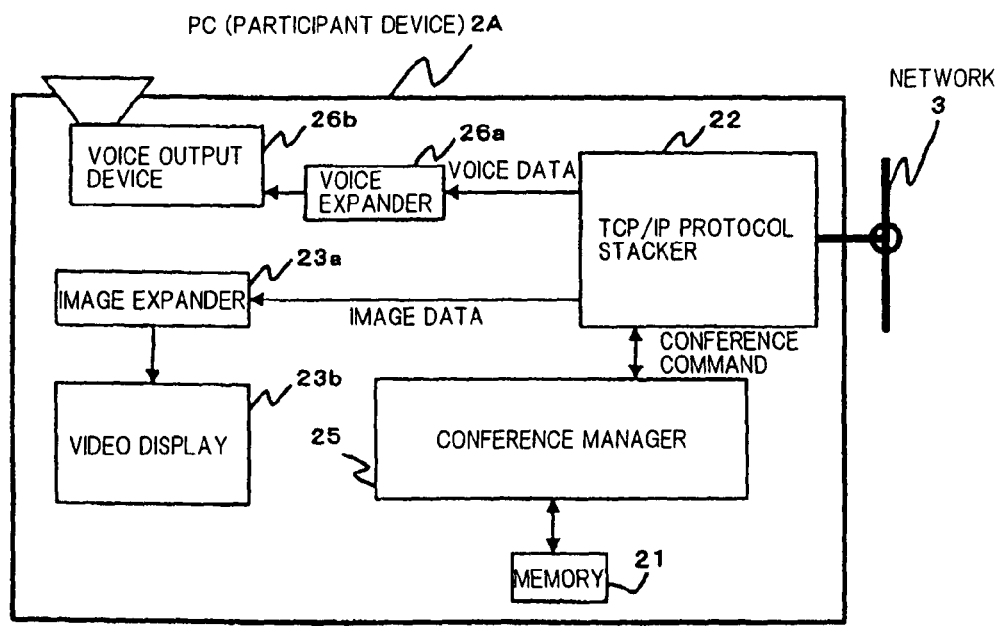
FIG. 8 is a block diagram showing components functioning when PC 2A is a participant's device.

FIG. 7 is a block diagram showing components functioning when PC 2A is a presenter's device. FIG. 8 is a block diagram showing components functioning when PC 2A is a participant's device. Note that, in FIGS. 7 and 8, identical symbols are assigned to identical elements shown in FIG. 6.

Note that the setting of the TCP/IP protocol stacker has been completed in projectors 1A to 1D and PCs 2A to 2F. Therefore, projectors 1A to 1D and PCs 2A to 2F can communicate with one another by connecting to network 3.

Regarding the parent-child relationship between the devices, referring to FIG. 4, projector 1A connected to PC 2A, which is a presenter's device, becomes the starting point of parent. A projector near PC 2A on a communication path (connection path) is defined as a parent. In addition, a projector far from PC 2A on the communication path (connection path) is defined as a child.

A conference master is defined as a projector to which a PC, which is a presenter's device, is connected directly. The conference master and the presenter's device maintain and manage the information on the entire conferencing system.

Projectors except the conference master become conference nodes. The conference node maintains and manages information on a parent connected directly thereto (direct parent) and information on a child connected directly thereto (direct child).

Image data and voice data are sent from a parent to its child in sequence.

The conference node sends image data and voice data sent by its parent to a device (its child).

Each PC sends a conference participation command when participating in the conferencing system. The conference participation command is sent from a child to its parent in sequence. The conference participation command finally reaches a presenter's device.

Figure 9:
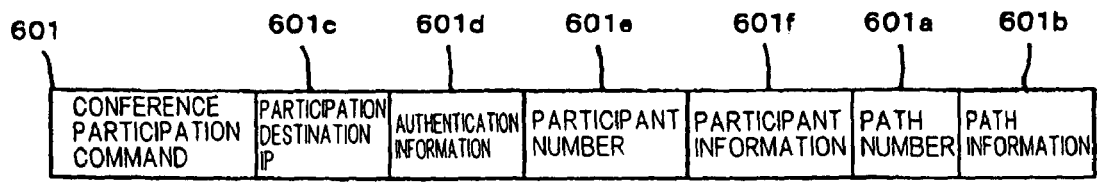
FIG. 9 is an explanatory diagram showing an example of a conference participation command.

FIG. 9 is an explanatory diagram showing an example of a conference participation command.

In FIG. 9, conference participation command 601 comprises path number 601a, path information 601b, participation destination IP (destination) 601c, authentication information 601d, participant number 601e and participant information 601f.

While conference participation command 601 is being relayed from a child to its parent, a relay (projector) in the conferencing system operates as follows. Upon accepting conference participation command 601, the relay (projector) attaches its own IP address to path information 601b, and additionally adds "one" to path number 601a.

Upon accepting conference participation command 601, the presenter's device sends a conference participation result command, which is a response command to the conference participation command.

Figure 10:
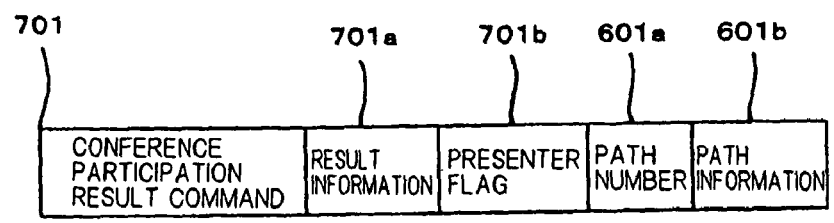
FIG. 10 is an explanatory diagram showing an example of a conference participation result command.

FIG. 10 is an explanatory diagram showing an example of a conference participation result command.

In FIG. 10, conference participation result command 701 comprises result information 701*a*, presenter flag 701*b*, path number 601*a* and path information 601*b*. Note that path number 601*a* and path information 601*b*, which are attached to conference participation command 601 corresponding to conference participation result command 701, are used as path number 601*a* and path information 601*b* in conference participation result command 701.

Upon accepting conference participation result command 701, a device (projector) relays conference participation result command 701 according to path information 601*b* in conference participation result command 701. Therefore, conference participation result command 701 finally reaches the device (participant's device: PC) that issued conference participation command 601 corresponding to conference participation result command 701.

A method for creating a command to which the path number and path information are attached is a general method.

Next, operation will be described.

(1) Creation of Conference Master

First, the creation of a conference master will be described.

Figure 11:
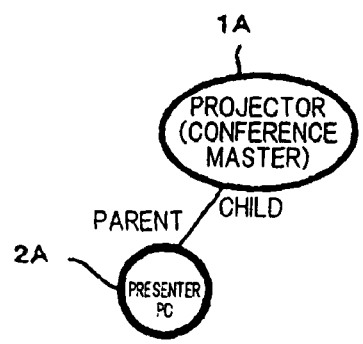
FIG. 11 is an explanatory diagram illustrating the creation of a conference master.

FIG. 11 is an explanatory diagram illustrating the creation of a conference master. Note that, in FIG. 11, identical symbols are assigned to identical elements shown in FIG. 4A or 4B.

The creation of the conference master will be described below with reference to FIGS. 5 to 8 and 11. Setting section 25*e* of PC 2A issues conference participation command 601 to projector 1A.

In conference participation command 601 (see FIG. 9) issued for projector 1A by PC 2A, "IP address of projector 1A" is described in participation destination IP 601*c*. In addition, in authentication information 601*d*, conference authentication information for authenticating participants (PC), which are connected to the conferencing system later, is described. In participant number 601*e*, "one" is described. "IP address of PC 2A" is described in participant information 601*f*. "One" is described in path number 601*a*. "IP address of PC 2A" is described in path information 601*b*.

When participation destination IP 301*c*, which represents a destination, is the IP address of itself, and projector 1A has no parent (when parent information is not stored in memory 11), setting section 13*c* of projector 1A stores in memory 11 the parent-child information in which PC 2A is described as its direct parent, so that projector 1A becomes a conference master. In addition, setting section 13*c* of projector 1A sets presenter flag 701*b* in conference participation result command 701 and sends conference participation result command 701 to PC 2A.

When presenter flag 701*b* in conference participation result command 701 has been set, setting section 25*e* of PC 2A stores a parent ID in memory 21, so that PC 2A becomes a presenter's device.

When the parent ID is stored in memory 21, transmission manager 25*a* causes screen capturing section 24*a* and voice recording device 24*c* to operate.

When starting operation, screen capturing section 24*a* captures the screen of display 23. Screen capturing section 24*a* provides image data, which represents the captured screen, to image compressor 24*b*.

Upon accepting the image data from screen capturing section 24*a*, image compressor 24*b* compresses the image data. Image compressor 24*b* sends the compressed image data to the direct child (projector 1A) of its own terminal through TCP/IP protocol stacker 22.

Upon receiving the image data from its direct parent through network 3 and TCP/IP protocol stacker 12, data controller 13*a* of projector 1A provides the image data to image expander 16.

Image expander 16 expands the image data accepted from conference manager 13. Image expander 16 provides the expanded image data to video display 17. Video display 17 projects a screen corresponding to the image data. That is to say, projector 1A projects an image corresponding to the image data sent from PC 2A, which became a presenter's device.

On the other hand, when starting operation, voice recording device 24*c* of PC 2A records the voice data accepted from microphone 27. Voice recording device 24*c* of PC 2A provides the voice data to voice compressor 24*d*.

Voice compressor 24*d* compresses the voice data accepted from voice recording device 24*c*. Voice compressor 24*d* uses TCP/IP protocol stacker 22 to send the compressed voice data to projector 1A through network 3.

Upon receiving the voice data from its direct parent through network 3 and TCP/IP protocol stacker 12, data controller 13*a* of projector 1A provides the image data to voice expander 14.

Voice expander 14 expands the voice data accepted from data controller 13*a*. Voice expander 14 provides the expanded voice data to voice output device 15. Voice output device 15 outputs voice corresponding to the voice data through a speaker or the like.

Referring to FIG. 11, PC 2A, which became a presenter's device, becomes a parent. Projector 1A, which became a conference master, becomes a child. Image data and voice data are sent from a parent to its child sequentially.

(2) Participation in Conference Master

Next, operation whereby another PC participates in the conferencing system will be described.

Figure 12:
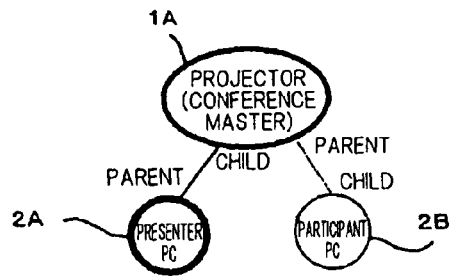
FIG. 12 is an explanatory diagram illustrating operation whereby another PC participates in the conferencing system.

FIG. 12 is an explanatory diagram illustrating operation whereby another PC participates in the conferencing system. Note that, in FIG. 12, identical symbols are assigned to identical elements shown in FIGS. 4A and 4B.

The operation of participation will be described below with reference to FIGS. 5 to 8 and 12. Setting section 25*e* of PC 2B issues conference participation command 601 to projector 1A.

In conference participation command 601 (see FIG. 9) issued by PC 2B to projector 1A, "IP address of projector 1A" is described in participation destination IP 601*c*. In addition, in authentication information 601*d*, conference authentication information is described. In participant number 601*e*, "one" is described. "IP address of PC 2B" is described in participant information 601*f*. "One" is described in path number 601*a*. "IP address of PC 2B" is described in path information 601*b*.

Setting section 13*c* of projector 1A relays conference participation command 601, which is accepted from PC 2B, to PC 2A (presenter's device), which is its parent. At that time, setting section 13*c* adds "one" to path number 601*a* in conference participation command 601, and adds "IP address of projector 1A" to path information 601*b*.

Setting section 25*e* of PC 2A, which is the presenter's device, examines whether or not PC 2B can participate in the conferencing system as a participant's device based on authentication information 601*d* in conference participation command 601. Regarding the examination method, general examination is performed, such as authentication by a password, and authentication by verification of the presenter himself/herself.

Setting section 25e stores the result of the examination in result information 701a in conference participation result command 701. In addition, setting section 25e does not set presenter flag 701b. In addition, setting section 25e adds path number 601a and path information 601b in conference participation command 601 to conference participation result command 701.

Setting section 25e sends the conference participation result command 701 to projector 1A.

Setting section 13c of projector 1A relays and sends to PC 2B the conference participation result command 701. At that time, when result information 701a of conference participation result command 701 indicates that the result of the examination is OK, setting section 13c adds information, which indicates that PC 2B has become its direct child, to the parent-child information in memory 11.

When the result of the examination is NG, setting section 25e of PC 2B finishes the operation of participation in the conference master without establishing the parent-child relationship.

On the other hand, when the result of the examination is OK, since presenter flag 701b in conference participation result command 701 has not been set, setting section 25e, without storing a parent ID in memory 21, assigns projector 1A to become a direct parent to construct a conference tree.

Referring to FIG. 12, projector 1A is connected as a parent, and PC 2B, which is a participant's device, is connected as a child.

Data controller 13a of projector 1A refers to the parent-child relationship in memory 11, and, when a device that is connected as a child appears, copies the image data and voice data that were sent to image expander 16 and voice expander 14. Data controller 13a of projector 1A uses TCP/IP protocol stacker 12 to start sending the copy to PC 2B (participant's device), which is its child, through network 3.

Upon receiving the image data, TCP/IP protocol stacker 22 of PC 2B, which is a participant's device, provides the image data to image expander 23a.

Image expander 23a expands the image data. Image expander 23a provides the expanded image data to video display 23b. Video display 23b displays a screen corresponding to the image data. That is to say, PC 2B, which is a participant's device, displays the same screen as that of a PC 2A, which is a presenter's device.

In addition, upon receiving the voice data, TCP/IP protocol stacker 22 of PC 2B provides the voice data to voice expander 26a.

Voice expander 26a expands the voice data. Voice expander 26a provides the expanded voice data to voice output device 26b. Voice output device 26b outputs voice corresponding to the voice data through a speaker or the like.

Referring to FIG. 12, projector 1A becomes the parent of PC 2B. PC 2B becomes the child of projector 1A. The image data and voice data are sent from a parent to its child sequentially [in order of PC 2A (presenter's device), projector 1A (conference master) and PC 2B (participant's device)].

(3) Creation of a Plurality of Conference Masters

Next, the creation of a plurality of conference masters will be described.

Figure 13:
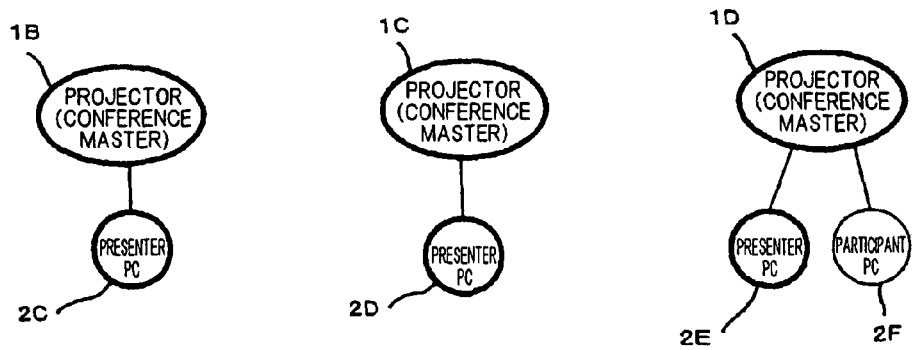
FIG. 13 is an explanatory diagram illustrating the creation of a plurality of conference masters.

FIG. 13 is an explanatory diagram illustrating the creation of a plurality of conference masters. Note that, in FIG. 13, identical symbols are assigned to identical elements shown in FIG. 4.

Referring to FIG. 13, a plurality of conference masters are created by performing the above described (1) creation of the conference master, and the above described (2) participation in the conference master on each of projector 1B, projector 1C and projector 1D.

(4) Creation of Conference Node

Next, the creation of a conference node will be described.

Figure 14:
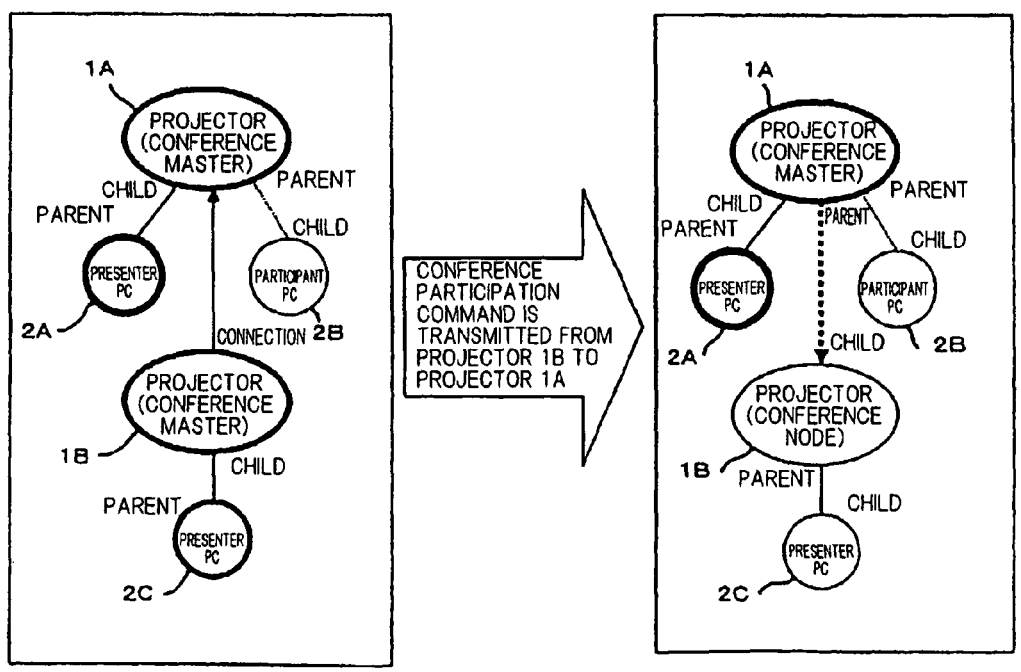
FIG. 14 is an explanatory diagram illustrating the creation of a conference node.

FIG. 14 is an explanatory diagram illustrating the creation of a conference node. Note that, in FIG. 14, identical symbols are assigned to identical elements shown in FIG. 13.

Referring to FIG. 14, setting section 25e of PC 2C, which is a presenter's device, sends conference participation command 601 to projector 1B.

In conference participation command 601 that is sent from PC 2C to projector 1B, "IP address of projector 1A" is described in participation destination IP 601c. In addition, in authentication information 601d, information for authenticating PC 2C is described. In participant number 601e, the number of devices "2", which are participating in the conferencing system in which PC 2C now exists, including projector 1B, is described. In participant information 601f, the IP address of each device, which is participating in the conferencing system in which PC 2C now exists, is described. "One" is described in path number 601a. "IP address of PC 2C" is described in path information 601b.

Setting section 13c of projector 1B sends conference participation command 601 to projector 1A described in participation destination IP 601c (IP address of projector 1A). When sending conference participation command 601, setting section 13c of projector 1B updates path number 601a and path information 301b in conference participation command 601 as described above.

Referring to FIG. 14, since projector 1A has a parent, setting section 13c of projector 1A relays conference participation command 601, which is accepted from projector 1B, to PC 2A, which is its parent.

Note that when relaying conference participation command 601, setting section 13c of projector 1A updates path number 601a and path information 601b in conference participation command 601 as described above. Setting section 25e of PC 2A, which is a presenter's device, examines whether or not a conference group of projector 1B (conferencing system) can participate in a conferencing system, in which PC 2A exists, based on authentication information 601d in conference participation command 601.

Setting section 25e of PC 2A stores the result of the examination in result information 701a in conference participation result command 701. Setting section 25e of PC 2A does not set presenter flag 701b, and adds path number 601a and path information 601b in conference participation command 601 to conference participation result command 701 (see FIG. 10).

Setting section 25e of PC 2A sends the conference participation result command 701 to projector 1A.

Referring to FIG. 14, setting section 13c of projector 1A sends conference participation result command 701 to PC 2C through projector 1B based on path information 601b.

Note that, when the result of the examination is OK, since presenter flag 701b in conference participation result command 701 has not been set, setting section 13c of projector 1A adds information, which indicates that projector 1B becomes its direct child, to the parent-child information in memory 11.

In addition, when the result of the examination is OK, since presenter flag 701b in conference participation result command 701 has not been set, setting section 13c of projector 1B changes the parent-child information in memory 11 to parent-child information, which indicates that projector 1A becomes its direct parent, and PC 2C becomes its direct child. Therefore, projector 1B is changed from a conference master to a conference node.

When the result of the examination is NG, setting section 25e of PC 2C finishes the operation without establishing the parent-child relationship.

On the other hand, when the result of the examination is OK, since presenter flag 701b in conference participation result command 701 has not been set, setting section 25e of PC 2C deletes the parent ID from memory 21.

Therefore, PC 2C becomes a participant's device, and has projector 1B as its direct parent. In addition, projector 1B has PC 2C as its direct child.

When the parent-child relationship is established, the image data and the voice data are sent in order of PC 2A, which is a presenter's device, projector 1A, projector 1B, and PC 2C, which is a participant's device.

Before and after projector 1B participates in the conferencing system in which PC 2A is a presenter's device, data transmission load of PC 2A is not increased, but the number of participants is increased.

Note that it has commonly been known that loads are distributed by forming the conference structure into a tree structure.

(5) Creation of a Plurality of Nodes

Figure 15:
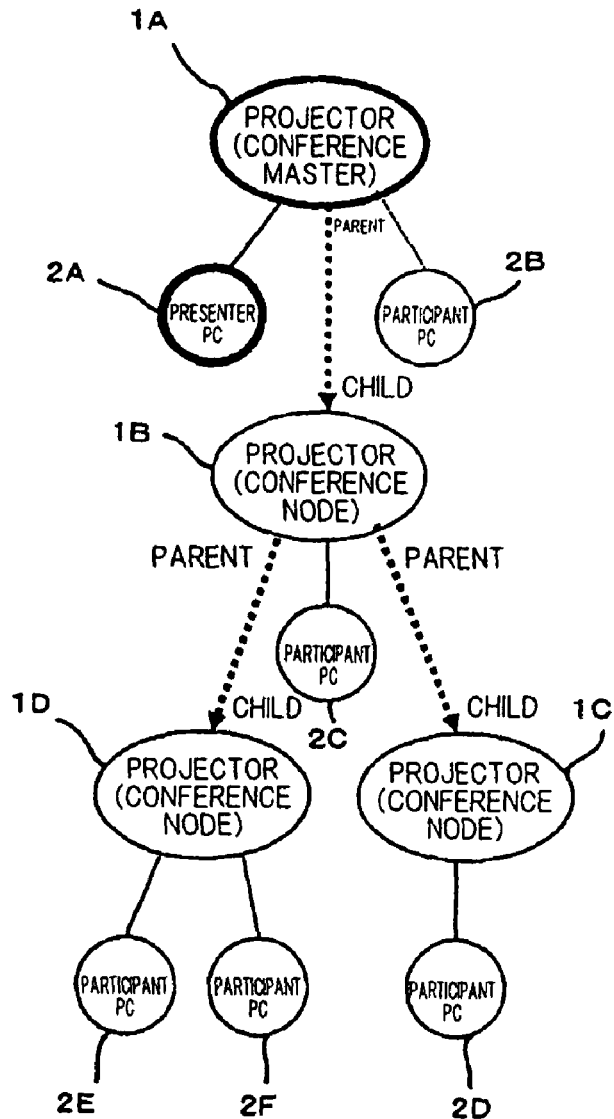
FIG. 15 is a block diagram showing a variation of a tree structure-type conferencing system of the first exemplary embodiment.

If a conferencing system to which projector 1C belongs, and a conferencing system to which projector 1D belongs, use conference participation command 601 in which the IP address of projector 1B is set as participation destination IP 601c in order to connect to a conferencing system to which projector 1A belongs, a conferencing system including a tree structure can be created, as shown in FIG. 15. Note that, in FIG. 15, identical symbols are assigned to identical elements shown in FIG. 4.

When the parent-child relationship is established, the image data and the voice data are first sent in order of PC 2A, which is a presenter's device, projector 1A, and projector 1B. Subsequently, the image data and the voice data are sent from projector 1B to projectors 1C and 1D. Then, the image data and the voice data are sent from projector 1C to PC 2D, which is a participant's device. In addition, the image data and the voice data are sent from projector 1D to PCs 2E and 2F, which are participant's device.

As shown in FIG. 1, when the structure of the conferencing system is not a tree structure, all data transmission loads concentrate on a presenter's device. As devices of participants increase, a communication band becomes deficient. Accordingly, image data and voice data may get behind.

Figure 2:
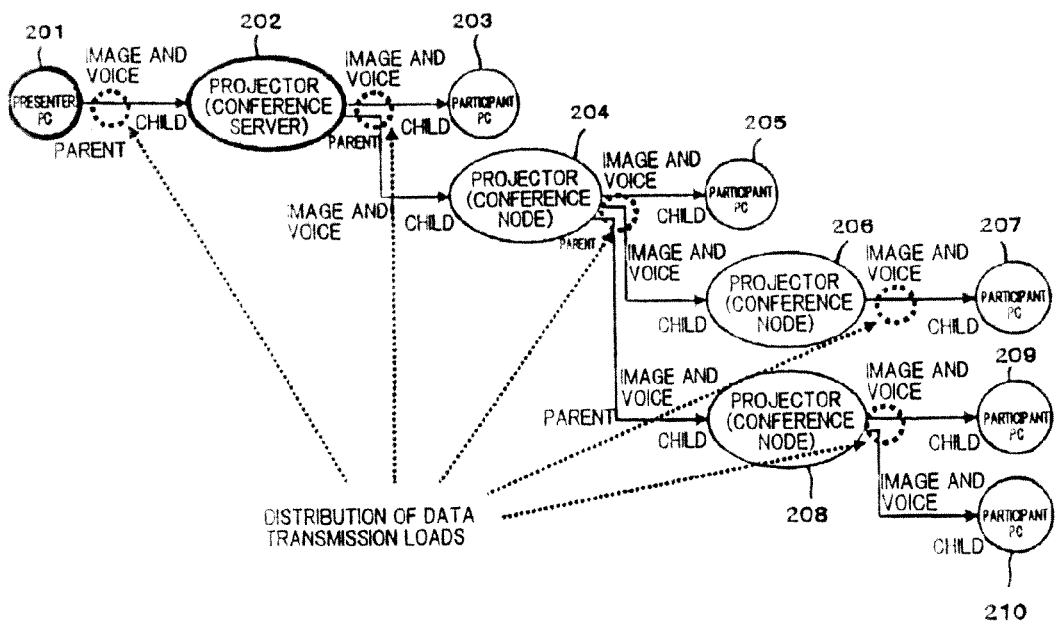
FIG. 2 is a block diagram showing a conferencing system including a tree structure.
Figure 3:
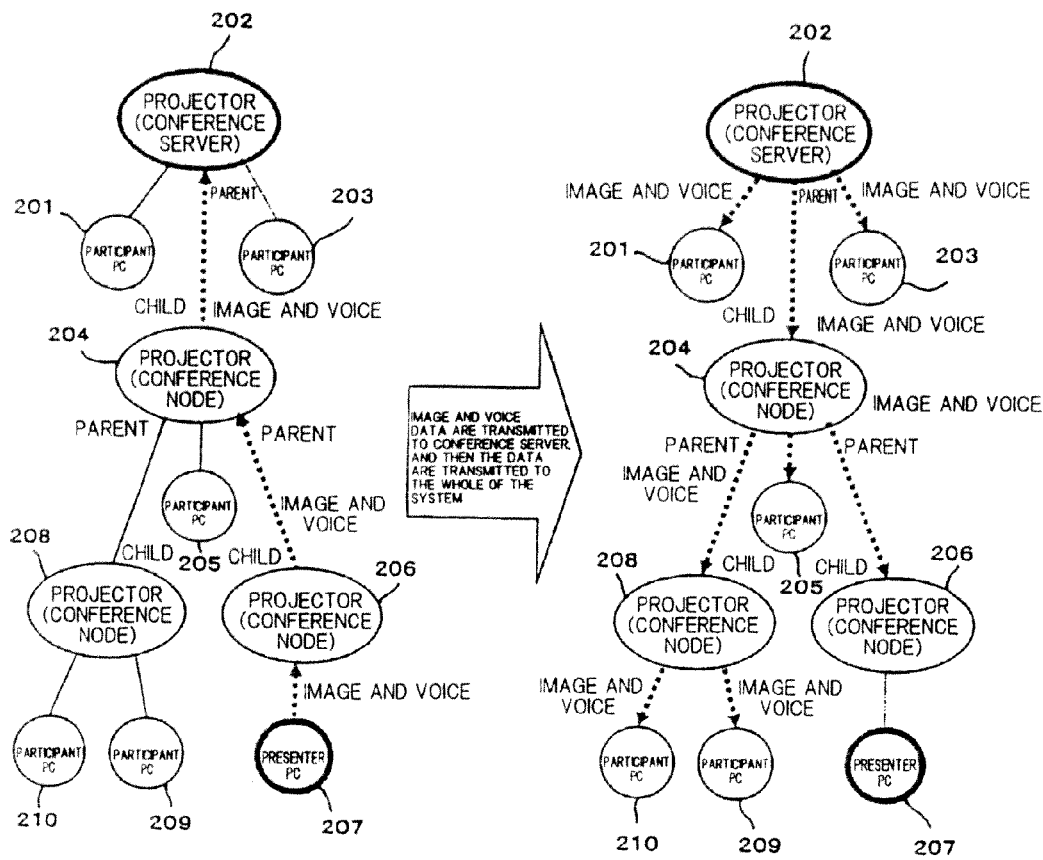
FIG. 3 is an explanatory diagram for illustrating the flow of data when PC 207 shown in FIG. 2 becomes a presenter's device.

As shown in FIG. 2, when the structure of the conferencing system is a tree structure, data transmission loads are distributed among each projector. In addition, the number of participants can be further increased.

It has commonly been known that data transmission loads are distributed by forming the conference structure into a tree structure.

Next, the switching operation of the presenter's device will be described.

First, the overview of the switching operation will be described.

In the tree structure conferencing system as shown in FIGS. 4A and 4B, when a PC, which was a participant's device, is switched to a presenter's device, a projector that is connected directly to the PC becomes a conference master that manages the conference. The previous conference master becomes a conference node that manages only a PC connected directly thereto (participant's device).

Therefore, the conference can continue with exactly the same method without affecting the advantages of the tree structure-type conferencing system, before and after the presenter's device is switched.

Next, the switching operation of a presenter's device will be described in detail with reference to FIGS. 16, 17, 18 and 19.

Figure 18:
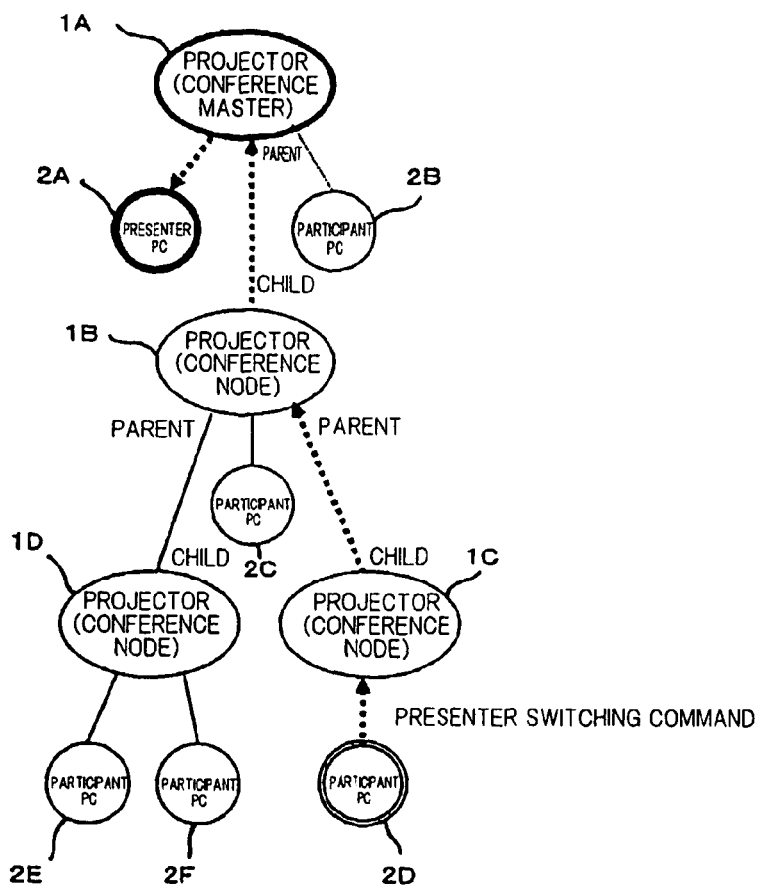
FIG. 18 is an explanatory diagram illustrating the switching operation of the presenter's device.
Figure 19:
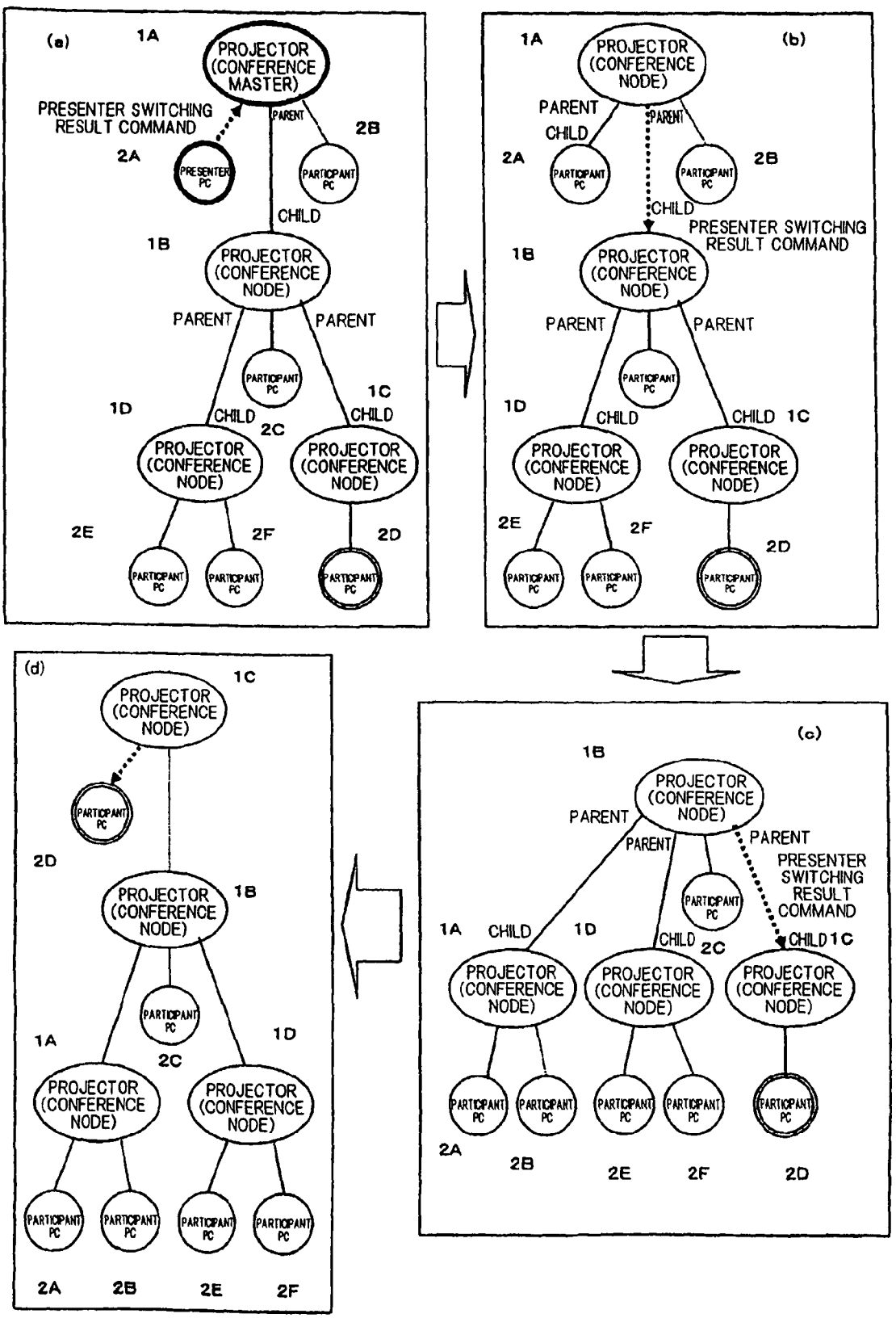
FIG. 19 is an explanatory diagram illustrating the switching operation of the presenter's device.

In FIG. 18, second change section 25d of PC 2D, which is a participant's device, issues a presenter switching command (switching request).

Figure 16:
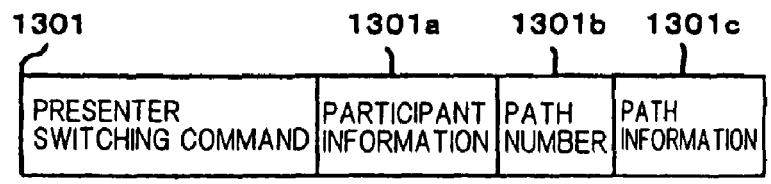
FIG. 16 is an explanatory diagram showing an example of a presenter switching command.

FIG. 16 is an explanatory diagram showing an example of a presenter switching command.

In FIG. 16, presenter switching command 1301 comprises participant information 1301a, path number 1301b and path information 1301c.

In presenter switching command 1301 issued by PC 2D, in participant information 1301a, information on PC 2D (IP address of PC 2D) is described. In addition, "one" is described in path number 1301b. "IP address of PC 2D" is described in path information 1301c.

When presenter switching command 1301 reaches PC 2A, which is a presenter's device, through projectors 1C, 1B and 1A, path number 1301b indicates "4", and "IP address of PC 2D", "IP address of projector 1C", "IP address of projector 1B" and "IP address of projector 1A" are described in path information 1301c.

Upon receiving presenter switching command 1301, first change section 25b of PC 2A performs authentication processing of presenter switching. The authentication processing is performed by a general method such as direct inquiry to the user of PC 2A.

Upon finishing authentication, first change section 25b of PC 2A sends a presenter switching result command to its direct child [see FIG. 19(a)].

Figure 17:
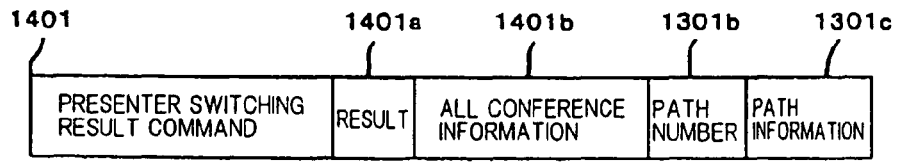
FIG. 17 is an explanatory diagram showing an example of a presenter switching result command.

FIG. 17 is an explanatory diagram showing an example of a presenter switching result command.

In FIG. 17, presenter switching result command 1401 comprises result 1401a, all conference information 1401b, path number 1301b and path information 1301c.

When the result of authentication is NG, regarding presenter switching result command 1401, first change section 25b of PC 2A stores "NG" in result 1401a, does not store data in all conference information 1401b, adds path number 1301b and path information 1301c in presenter switching command 1301, and sends presenter switching result command 1401.

When "NG" is stored in result 1401a, special processing is not performed along the path of presenter switching result command 1401, and presenter switching result command 1401 reaches PC 2D. PC 2D displays the result of NG.

On the other hand, when the result of authentication is "OK", regarding presenter switching result command 1401, first change section 25b of PC 2A stores "OK" in result 1401a, stores "all conference information managed by PC 2A" in all conference information 1401b, adds path number 1301b and path information 1301c in presenter switching command 1301, and sends the presenter switching result command (permission information) 1401 to projector 1A.

Next, first change section 25b of PC 2A deletes the parent ID stored in memory 21. This processing causes transmission manager 25a of PC 2A to stop the operation of screen capturing section 24a and voice recording device 24c of PC 2A. Therefore, PC 2A switches from a presenter's device to a participant's device. Accordingly, the transmission of image data and voice data stops.

Change section 13b of projector 1A that received presenter switching result command 1401 sends presenter switching result command 1401 to projector 1B (see FIG. 19(b)).

Note that when result 1401a of presenter switching result command 1401 is "OK", change section 13b of projector 1A changes the parent-child information in memory 11 in order to reverse the parent-child relationship between projector 1A and PC 2A, and in order to reverse the parent-child relationship between projector 1A and projector 1B.

As a result, PC 2A becomes the direct child of projector 1A. In addition, projector 1A becomes the direct parent of PC 2A. In addition, projector 1A becomes the direct child of projector 1B. In addition, projector 1B becomes the direct parent of projector 1A.

In addition, since PC 2A is switched from a presenter's device to a participant's device, projector 1A switches from a conference master to a conference node.

Change section 13b of projector 1B receives presenter switching result command 1401, and then sends presenter switching result command 1401 to projector 1C (see FIG. 19(c)).

Note that when result 1401a is "OK", change section 13b of projector 1B changes the parent-child information in memory 11 in order to reverse the parent-child relationship between projector 1B and projector 1A, and in order to reverse the parent-child relationship between projector 1B and projector 1C.

As a result, projector 1A becomes the direct child of projector 1B. In addition, projector 1B becomes the direct parent of projector 1A. In addition, projector 1B becomes the direct child of projector 1C. In addition, projector 1C becomes the direct parent of projector 1B.

Change section 13b of projector 1C receives presenter switching result command 1401, and then sends presenter switching result command 1401 to PC 2D (see FIG. 19(d)).

Note that when result 1401a is "OK", change section 13b of projector 1C changes the parent-child information in memory 11 in order to reverse the parent-child relationship between projector 1C and projector 1B, and in order to reverse the parent-child relationship between projector 1C and PC 2D.

As a result, projector 1B becomes the direct child of projector 1C. In addition, projector 1C becomes the direct parent of projector 1B. Projector 1C becomes the direct child of PC 2D. PC 2D becomes the direct parent of projector 1C.

Referring to FIG. 4B, when result 1401a is "OK", second change section 25d of PC 2D, which received presenter switching result command 1401, finally changes the parent information in memory 21 to a parent ID. Therefore, the parent-child relationship between PC 2D and projector 1C is reversed. Therefore, projector 1C becomes the direct child of PC 2D. In addition, PC 2D becomes the direct parent of projector 1C.

Then, since PC 2D switches from a participant's device to a presenter's device, projector 1C becomes a conference master. Thus the reconstruction of the conference tree is completed. Therefore, the transmission of image data and voice data is started from PC 2D, which is a presenter's device. Thus, the switching of the presenter's device is completed.

According to the present exemplary embodiment, the following effects are obtained.

The first effect is that, in the present exemplary embodiment, image data and voice data can be sent immediately to the entire conference, as opposed to requiring useless data processing of sending the image data and the voice data to a conference master one time when a terminal on the conference node side is switched to a presenter's terminal without reconstructing a conference tree.

The second effect is that the regularity of the method for transmitting the image and voice data and the regularity of the method for sending a conference command does not change before and after the presenter's device is switched. Therefore, a program for defining the operation of projectors and PCs can be simplified.

The third effect is that the conference tree can be partially reconstructed. For example, like projector 1D (conference node) shown in FIG. 4B, there is a portion that does not require any reconstruction processing.

According to the present exemplary embodiment, the PC, which sent presenter switching command 1301 and then received presenter switching result command 1401 (permission information) in which result 1401a was OK, is switched from a child to a parent. In addition, the PC, which received presenter switching command 1301 and then sent presenter switching result command 1401 for which result 1401a was OK, is switched from a parent to a child. In addition, in the projector that performed communication processing of presenter switching command 1301 and presenter switching result command 1401 in which result 1401a was OK, the direct parent and the direct child are changed.

Therefore, the tree structure comprised of PCs and projectors is switched to a tree structure in which the PC, which sent presenter switching command 1301 and then received presenter switching result command 1401 (permission information) in which result 1401a was OK, serves as a root node.

Accordingly, the occurrence of useless data processing that accompanies data communication can be prevented even when a PC that sends image data, that is to say, a presenter's device is switched.

In addition, in the present exemplary embodiment, the PC that became a presenter's device also sends voice data.

In this case, even when the presenter's device is switched, image data as well as voice data can be provided without generating useless data processing that accompanies data communication. Therefore, for example, if a presenter of a conference uses a PC, which became a presenter's device, the presenter can use a projector and another PC to provide an image intended by the presenter and to provide the voice of the presenter to the participants in the conference.

Next, a tree structure-type conferencing system of a second exemplary embodiment will be described.

Figure 20:
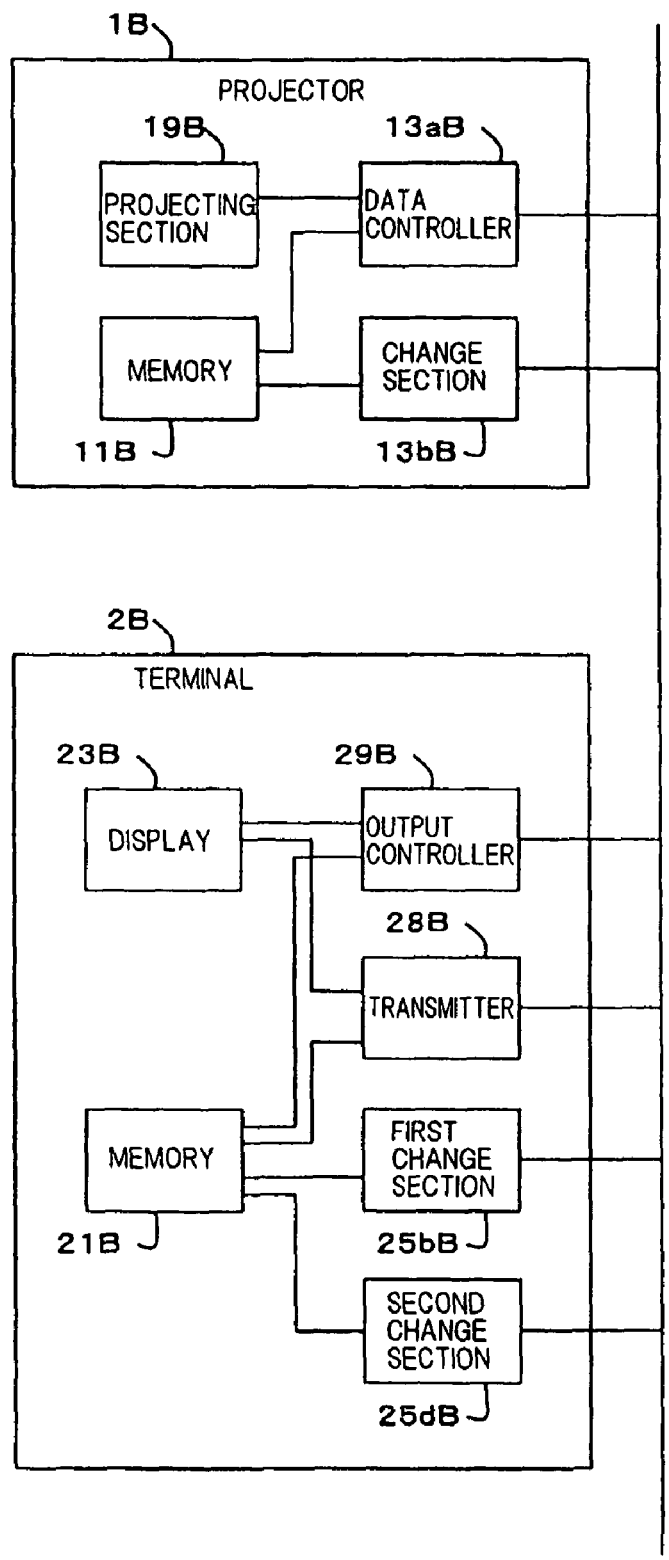
FIG. 20 is a block diagram showing a tree structure-type conferencing system of a second exemplary embodiment.

FIG. 20 is a block diagram showing a tree structure-type conferencing system of a second exemplary embodiment. The tree structure-type conferencing system of the second exemplary embodiment comprises projector 1B and terminal 2B, which is the minimum configuration.

In FIG. 20, projector 1B comprises projecting section 19B, memory 11B, data controller 13aB and change section 13bB. Terminal 2B comprises memory 21B, display 23B, transmitter 28B, first change section 25bB, output controller 29B and second change section 25dB.

Projector 1B can function as a node in a tree structural network. Projecting section 19B is sometimes called projecting means. Memory 11B is sometimes called storage means or a storage section. Data controller 13aB is sometimes called data control means. Change section 13bB is sometimes called change means.

Memory 11B stores parent-child information indicating its direct parent and its direct child on a network to which projector 1B is connected.

When receiving image data from the direct parent indicated in the parent-child information in memory 11B, data controller 13aB uses projecting section 19B to project an image corresponding to the image data, and sends the image data to the direct child indicated in the parent-child information.

When receiving a switching request for making a request to switch the parent-child relationship from its direct child, change section 13bB sends the switching request to its direct parent.

In addition, when receiving permission information, which represents the permission to switch, from its direct parent, change section 13bB sends the permission information to the direct child, which sent the switching request, and changes the parent-child information so that the direct parent becomes a direct child, and the direct child, which sent the switching request, becomes a direct parent.

Terminal 2B can function as a node in a tree structural network. Memory 21B is sometimes called storing means or a storing section. Display 23B is sometimes called display means. Transmitter 28B is sometimes called transmission means. First change section 25bB is sometimes called first change means. Output controller 29B is sometimes called output control means. Second change section 25dB is sometimes called second change means.

Memory 21B stores a parent ID when its own terminal is a parent.

Display 23B displays images.

When memory 21B stores a parent ID, transmitter 28B sends image data corresponding to the image displayed on display 23B to a child on the network to which its own terminal is connected.

Under circumstances where memory 21B stores the parent ID, when receiving from its child a switching request for making a request to switch the parent-child relationship, first change section 25bB sends permission information, which represents the permission to switch, to the child, and deletes the parent ID in memory 21B.

Under circumstances where memory 21B stores no parent ID, when receiving image data from its parent on a network to which its own terminal is connected, output controller 29B displays an image corresponding to the image data on display 23B.

Under circumstances where memory 21B stores no parent ID, when receiving an instruction to send a switching request, second change section 25dB sends the switching request to its parent, and when receiving permission information from its parent, stores the parent ID in memory 21B.

According to the above exemplary embodiment, when the above projectors and the above terminals are connected, the terminal, which sent the switching request and received the permission information, is switched from a parent to a child, the terminal, which received the switching request and sent the permission information, is changed from a parent to a child, and in the projector that performed communication processing of the switching request and the permission information, the direct parent and the direct child are changed.

Therefore, the tree structure comprised of terminals and projectors is switched to a tree structure in which the terminal, which sent the switching request and received the permission information, serves as a root node.

Accordingly, the occurrence of useless data processing that accompanies data communication can be prevented even when a terminal that sends image data is switched.

Note that it is preferred that the above projector further comprises a sound output section for outputting sound, and, when receiving sound data from its direct parent indicated in the parent-child information, the data controller outputs sound corresponding to the sound data from the sound output section.

In addition, it is preferred that the above terminal further comprises a sound data output section for outputting sound data, and a sound output section for outputting sound, the transmitter sends sound data outputted by the sound data output section to the child when the storing section stores the parent ID, and the output controller outputs sound corresponding to the sound data from the sound output section under circumstances where the storing section does not store the parent ID, when receiving the sound data from the parent.

In this case, even when a terminal that sends data is switched, image data as well as voice data can be provided without generating useless data processing that accompanies data communication. Therefore, for example, if a presenter of a conference uses a terminal, which is a parent, the presenter can use a projector and another PC to provide an image intended by the presenter and to provide the voice of the presenter to the participants in the conference.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

This application is based upon and claims the benefit of priority from Japanese patent application No. 2006-330641, filed on Dec. 7, 2006, the disclosure of which is incorporated herein in its entirety by reference.

The invention claimed is:

1. A projector that can function as a node in a tree structural network comprising:
   a projecting section;
   a conference management section providing a conference management function;
   a storage section that stores parent-child information that indicates a direct parent and a direct child in the network;
   a data controller that uses the projecting section to project an image corresponding to image data and sends the image data to the direct child indicated in the parent-child information when receiving the image data from the direct parent indicated in the parent-child information;
   a change section that, when receiving a switching request to make a request to switch a parent-child relationship from the direct child, sends the switching request to the direct parent, and that, when receiving permission information representing permission to switch from the direct parent, sends the permission information to the direct child that sent the switching request and changes the parent-child information so that the direct parent becomes the direct child, and the direct child that sent the switching request becomes the direct parent; and
   a setting section that sets the projector which is connected directly to a presenter as a conference master.

2. The projector according to claim 1, further comprising:
   a sound output section that outputs sound, wherein when receiving sound data from the direct parent indicated in the parent-child information, said data controller outputs sound corresponding to the sound data from said sound output section.

3. A conferencing system comprised of a projector and a terminal that can function as a node in a tree structural network, wherein the projector comprises:
   a projecting section;
   a conference management section providing a conference management function;
   a storage section that stores parent-child information that indicates a direct parent and a direct child in the network;
   a data controller that uses the projecting section to project an image corresponding to image data and sends the image data to the direct child indicated in the parent-child information when receiving the image data from the direct parent indicated in the parent-child information;

a change section that, when receiving a switching request for making a request to switch a parent-child relationship from the direct child, sends the switching request to the direct parent, and that, when receiving permission information representing permission to switch from the direct parent, sends the permission information to the direct child that sent the switching request and changes the parent-child information so that the direct parent becomes the direct child, and the direct child that sent the switching request becomes the direct parent; and a setting section that sets the projector which is connected directly to a presenter as a conference master, wherein the terminal comprises:

a storing section that stores a parent ID when its own terminal is a parent;

a display that displays an image;

a transmitter that sends image data corresponding to the image displayed on the display to a child on a network to which its own terminal is connected when the storing section stores the parent ID;

a first change section that sends the permission information to the child and deletes the parent ID in the storing section, when receiving the switching request from the child under circumstances where the storing section stores the parent ID;

an output controller that, when receiving the image data from a parent on the network to which its terminal is connected under circumstances where the storing section does not store the parent ID, displays an image corresponding to the image data on the display; and a second change section that, under circumstances where the storing section does not store the parent ID when accepting an instruction to send the switching request, sends the switching request to the parent, and that stores the parent ID in the storing section when receiving the permission information from the parent.

4. A tree structure switching method of a projector that can function as a node in a tree structural network, the method comprising:

storing parent-child information that indicates a direct parent and a direct child in the network;

projecting an image corresponding to image data and sending the image data to the direct child indicated in the parent-child information when the image data is received from the direct parent indicated in the parent-child information;

sending a switching request for making a request to switch a parent-child relationship to the direct parent when the switching request is received from the direct child; and sending permission information representing permission to switch to the direct child that sent the switching request and changing the parent-child information so that the direct parent becomes the direct child, and the direct child that sent the switching request becomes the direct parent when the permission information is received from the direct parent.

5. The tree structure switching method according to claim 4 further comprising outputting sound corresponding to sound data when the sound data is received from the direct parent indicated in the parent-child information.

6. A non-transitory computer readable recording medium, on which a program is embedded, the program causing a computer that can function as a node in a tree structural network to execute:

a procedure for storing parent-child information that indicates a direct parent and a direct child in the network;

a procedure for projecting an image corresponding to image data and sending the image data to the direct child indicated in the parent-child information when the image data is received from the direct parent indicated in the parent-child information;

a procedure for sending a switching request for making a request to switch a parent-child relationship to the direct parent when the switching request is received from the direct child;

a procedure for sending permission information representing permission to switch to the direct child that sent the switching request and for changing the parent-child information so that the direct parent becomes the direct child, and the direct child that sent the switching request becomes the direct parent when the permission information is received from the direct parent; and a procedure for setting the projector which is connected directly to a presenter as a conference master.

7. The recording medium according to claim 6, on which the program further causes the computer to execute:

a procedure for outputting sound corresponding to sound data, when the sound data is received from the direct parent indicated in the parent-child information.

8. A projector that can function as a node in a tree structural network comprising:

projecting means;

conference management means for providing a conference management function;

storage means for storing parent-child information that indicates a direct parent and a direct child in the network;

data control means for using the projecting means to project an image corresponding to image data and for sending the image data to the direct child indicated in the parent-child information when receiving the image data from the direct parent indicated in the parent-child information;

change means for, when receiving a switching request to make a request to switch a parent-child relationship from the direct child, sending the switching request to the direct parent, and for, when receiving permission information representing permission to switch from the direct parent, sending the permission information to the direct child that sent the switching request and for changing the parent-child information so that the direct parent becomes the direct child, and the direct child that sent the switching request becomes the direct parent; and setting means for setting the projector which is connected directly to a presenter as a conference master.

9. A conferencing system comprised of a projector and a terminal that can function as a node in a tree structural network, wherein the projector comprises:

projecting means;

conference management means for providing a conference management function;

storage means for storing parent-child information that indicates a direct parent and a direct child in the network;

data control means for using the projecting means to project an image corresponding to image data and for sending the image data to the direct child indicated in the parent-child information when receiving the image data from the direct parent indicated in the parent-child information;

change means for, when receiving a switching request for making a request to switch a parent-child relationship from the direct child, sending the switching request to the direct parent, and for, when receiving permission information representing permission to switch from the direct parent, sending the permission information to the direct child that sent the switching request and changing the parent-child information so that the direct parent becomes the direct child, and the direct child that sent the switching request becomes the direct parent; and a setting means for setting the projector which is connected directly to a presenter as a conference master, wherein the terminal comprises:

storage means for storing a parent ID when its own terminal is a parent;

display means for displaying an image;

transmission means for sending image data corresponding to the image displayed on the display means to a child on a network to which its own terminal is connected when the storage means stores the parent ID;

first change means for sending the permission information to the child and deleting the parent ID in the storage means, when receiving the switching request from the child under circumstances where the storage means stores the parent ID;

output control means, when receiving the image data from a parent on the network to which its terminal is connected under circumstances where the storage means does not store the parent ID, for displaying an image corresponding to the image data on the display means; and second change means, under circumstances where the storage means does not store the parent ID when accepting an instruction to send the switching request, for sending the switching request to the parent, and for storing the parent ID in the storage means when receiving the permission information from the parent.

* * * * *